April 18, 1967

L. VOO 3,314,601

CALCULATING MACHINE

Filed Jan. 11, 1965

INVENTOR.

LEAR VOO

April 18, 1967 L. VOO 3,314,601
CALCULATING MACHINE
Filed Jan. 11, 1965 5 Sheets-Sheet 2

INVENTOR.

LEAR VOO

INVENTOR.
LEAR VOO

April 18, 1967 L. VOO 3,314,601
CALCULATING MACHINE
Filed Jan. 11, 1965 5 Sheets-Sheet 4

*INVENTOR.*

LEAR VOO

United States Patent Office 3,314,601
Patented Apr. 18, 1967

---

3,314,601
CALCULATING MACHINE
Lear Voo, 35—20 Leverich St.,
Jackson Heights, N.Y. 11372
Filed Jan. 11, 1965, Ser. No. 424,675
22 Claims. (Cl. 235—60)

This invention relates to calculating machines, and more particularly to a single-order-keyboard key-actuated calculating machine where a digital value is registered and accumulated on a numeral wheel of its register by pressing one of its digit keys without the necessity of operating any other functional keys, such as "total" and "sub-total" keys, substantially as the calculating machine of my invention set forth in United States Patent No. 3,100,602, dated Aug. 13, 1963; and the present application is a continuation-in-part of my pending application Ser. No. 355,354, filed Mar. 27, 1964 which is hereby abandoned.

Calculating machines available today are highly complex, bulky and very expensive. None of the calculating machines presently on the market are truly portable so that they can be carried in one's pocket to be constantly available for use.

The calculating machine of this invention is truly portable and performs all the processes of arithmetic in a simple easily understood manner. Furthermore, the results of the arithmetic are immediately visible on the register even as the process is being performed.

This new calculating machine is capable of providing the above features by incorporating a new register means in which the register wheels are independently slidably mounted on a tubular shaft which in turn surrounds a main actuating axle. The axle and tubular shaft cooperate with a novel connecting mechanism and motion transfer device to rotate a selected numeral wheel of the register in response to selective operation of one of a set of digit keys so that the wheel rotates one of a plurality of differing displacements corresponding to the digital indicium on the operated key. This calculator also incorporates a resetting key that simultaneously rotates all the numeral wheels to zero-registry position and automatically sets the calculator for the next operation. Another feature of this calculator is a simple mechanism for automatically returning the register to its starting position upon entry of the last digit of each number.

Therefore, it is the object of this invention to provide a new and improved single-order-keyboard key-actuated calculating machine capable of performing all four processes of arithmetic, that is, addition, subtraction, multiplication, and division, with their respective results, that is, sum of addition, remainder of subtraction, product of multiplication and quotient of division, distinctly and accurately displayed in its register.

Another object of this invention is to provide a new and improved single-order-keyboard calculating machine of extremely compact size that makes it truly pocketable—not merely portable—without recourse to miniaturalization of its operational keys and components of its mechanism.

A further object of this invention is to provide for a single-order-keyboard calculating machine a new, novel and efficient means for registration of the values of the digits of a number of the numeral wheels of its register singly and successively in descending order upon successive pressing of its digit keys corresponding to the digits of said number with registration of the values of the digits of a subsequent number operable in the same manner immediately following the registration of the value of the last digit of said preceeding number.

A still further object of this invention is to provide for a calculating machine a new, novel and efficient means to zeroize all those of the numeral wheels of its register that are not in zero-registry positions by a single operation of a resetting key, said operation simultaneously restoring the machine for operation of a new calculation.

A still further object of this invention is to provide for a calculating machine a new, novel and efficient means for automatic registration of quotient of division on the numeral wheels of its register.

A still further object of this invention is to provide for a calculating machine a new, novel and efficient means for automatic carrying of a digital value of one to a numeral wheel of its register when an adjacent numeral wheel of the next lower order shall have an accumulated digital value exceeding that of the indicium of the highest digit thereon, and alternately for automatic borrowing of a digital value of one from a numeral wheel of its register when an adjacent numeral wheel of the next lower order shall have a residual digital value of less than zero.

A still further object of this invention is to provide for a calculating machine a new, novel and efficient means to visually punctuate the numerals displayed in its register variably by differing sets of punctuation marks.

A still further object of this invention is to provide for a calculating machine a new, novel and effiicent means for indication of a numeral wheel of its register on which a digital value may be registered upon pressing one of its digit keys.

A still further object of this invention is to provide for a calculating machine a new, novel and efficient method for predetermination of decimal point of quotient of division.

Other objects and advantages of this invention will become apparent from the detailed description of the preferred embodiment of the calculating machine illustrated in the accompanying drawings, in which.

I have shown in the drawings and will hereinafter describe in detail the preferred embodiment of the calculating machine of this invention, which is susceptible of various modifications and alternative constructions, and do not intend to limit the invention to the specific form disclosed herein but intend to cover all modifications and alternative constructions thereof falling within the spirit and scope of this invention as expressed in the appended claims.

Figure 1:
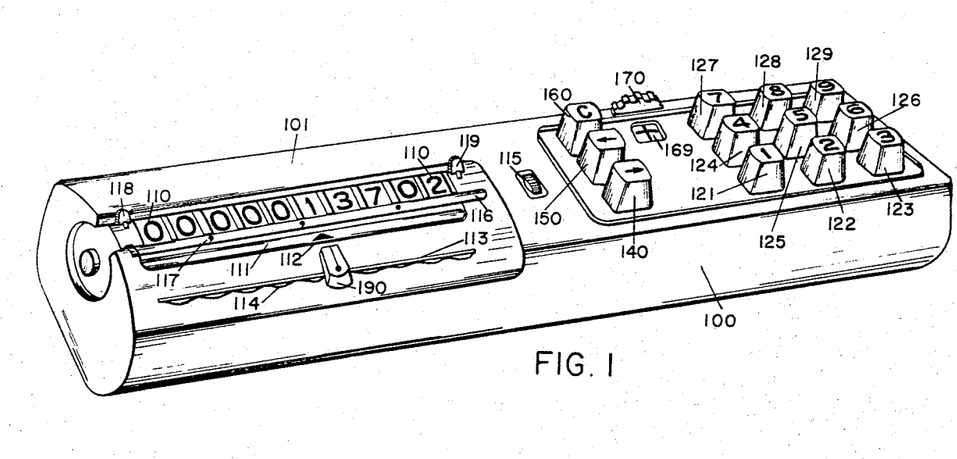
FIGURE 1 is a perspective view of the calculating machine embodying the features of this invention in substantially its actual size.
Figure 2:
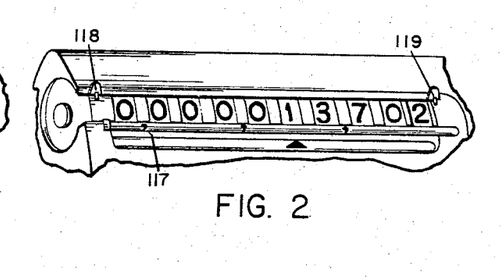
FIGURE 2 is a fragmentary top view of the machine, illustrating the display of a differing set of punctuation marks from that illustrated in FIGURE 1.
Figure 3:
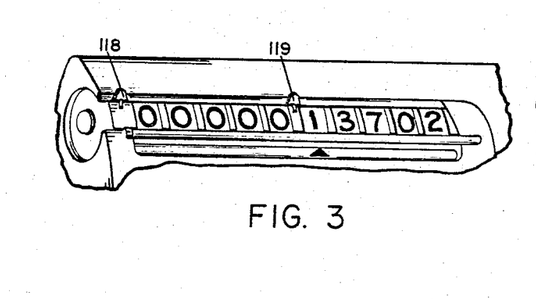
FIGURE 3 is a fragmentary top view of the machine like FIGURE 2, illustrating no punctuation mark being displayed.

The machine, as shown in FIGURE 1, has an outer casing 100 in which its mechanism is housed. On the top of the machine, there are arranged:

(A) a set of nine selectively depressible digit keys 121–129, each having thereon an indicium of one of a sequence of nine digits of "1" to "9," both inclusive, and being disposed, upon pressing thereof, to enter a digital value equal to that of its indicium into one of a plurality of register windows 110 in the top plate 101 of the casing 100 indicated by an indicator mark 112 displayed in an indicator slot 111 in the top plate 101 and, after entry of the digital value thereinto, to shift the display of indicator mark 112 in the indicator slot 111 one position to the right, or to its starting position of display in the indicator slot 111 pointed at by a pointer 190, if the indicator mark 112 were initially displayed in the indicator slot 111 at its rightmost position;

(B) a depressible shift key 140 disposed, upon pressing thereof, to shift the display of indicator mark 112 in the indicator slot 111 one position to the right, or to its starting position of display in the indicator slot 111 pointed at by the pointer 190 if the indicator mark 112 were initially displayed in the indicator slot 111 at its rightmost position, in the same manner as pressing one of the digit keys 121–129 but without entering a digital value into the registry window 110 indicated by the indicator mark 112;

(C) a depressible return key 150 disposed, upon pressing thereof, to return the display of indicator mark 112 in the indicator slot 111 at any position thereof to its starting position of display in the indicator slot 111 pointed at by the pointer 190;

(D) a depressible reset key 160 disposed, upon pressing thereof, to zeroize all of the numerals displayed at random in the register windows 110 and simultaneously to reset a calculation selector 170 to the position of addition indicated by an addition sign "+" displayed in a calculation window 169 in the top plate 101 if it were not in that position;

(E) a calculation selector 170 disposed, upon selective turning thereof, to condition the machine for operation of one of the three processes of calculation, addition including multiplication, subtraction, and division, indicated respectively by the calculation signs "+," "—," and "÷" displayed in the calculation window 169;

(F) a punctuation-mark selector 115 disposed, upon selective turning thereof, to select an appropriate set of punctuation marks 117 to visually punctuate the numerals displayed in the register windows 110; the punctuation-mark selector 115 (FIGURE 4) being rigidly mounted on a punctuation-mark axle 116 on the periphery of which differing sets of the punctuation marks 117 are inscribed and which is journalled at its both ends rotatably in walls 103 and 107 respectively; in one radial position of the punctuation-mark selector 115, one set of punctuation marks 117, as shown in FIGURE 1, is displayed to punctuate the illustrated numerals "13702" into "137.02"; in another radial position of the punctuation-mark selector 115, a differing set of punctuation marks 117, as shown in FIGURE 2, is displayed to punctuate the illustrated numeral "13702" into "13,702"; and in a third radial position of the punctuation-mark selector 115, no punctuation mark is displayed, as shown in FIGURE 3;

(G) two decimal pointers 118 and 119 mounted for movement from positions of nondisplay at the register windows 110 to those of display thereat to decimal-point the numerals displayed in the register windows 110 not otherwise punctuated; as shown in FIGURE 3, decimal pointer 119 being moved to the left of the first numeral "1" of the illustrated numerals "13702" to decimal-point the numerals into a fractional number ".13702"; and (H) a pointer 190 manually movable in front of the register windows 110 in and along a pointer slot 113 in the top plate 101 to point at one of the register windows 110 to be a "home" window where an entry of a number and that of every subsequent number are to begin.

Figure 4:
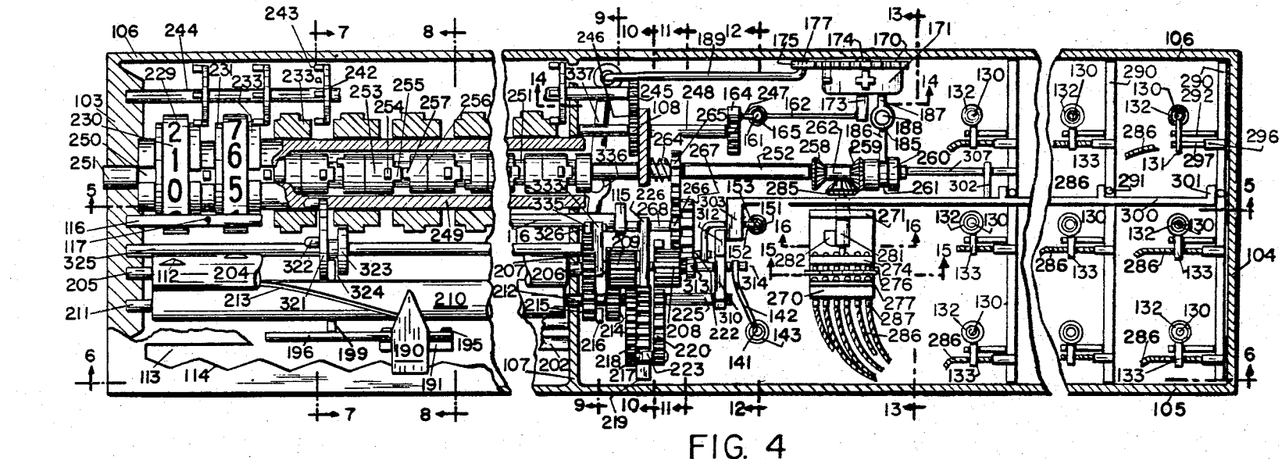
FIGURE 4 is a plan view of the machine with its outer casing removed, showing substantially its complete mechanism with certain parts omitted or exploded for sake of clarity.

The mechanism of the machine housed inside the outer casing 100 is substantially as shown in FIGURE 4.

DIGIT REGISTERING SYSTEM

Figure 17:
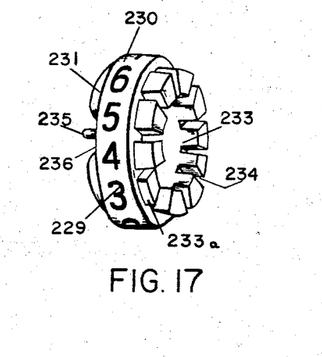
FIGURE 17 is a perspective view of a numeral wheel of the machine.

A plurality of ordinally arranged numeral wheels 230 are loosely mounted on a rotary hollow or tubular shaft 249, spaced apart one from another. The tubular shaft 249 (see also FIGURE 5) is journalled at its ends rotatably in walls 103 and 107 respectively, and has a longitudinal slot 250 in its wall extending axially through substantially its entire length. Each of the numeral wheels 230 has, on its periphery, a plurality of indicia 229 of a sequence of ten digits of "0" to "9" both inclusive. The indicia 229 are equally spaced circumferentially one from another and are visually sighted through a corresponding register window 110 in the top plate 101. As shown in FIGURE 17, on the rightside face of each of the numeral wheels 230, there are formed ten radially extending ribs 233 equally spaced radially one from another thereby creating ten open grooves 234 interposed between every pair of adjacent ribs 233; and on its leftside face, there is a pin 235 disposed adjacent a concavity 236 in a partially recessed portion 231 of its periphery, said pin 235 having a predetermined positional relationship with its zero indicium. One of the ribs 233, rib 233*a*, is partially depressed radially for a purpose to be described hereinafter, said rib 233*a* having a predetermined positional relationship with its zero indicium. Each of the numeral wheels 230 is provided with a resilient restrainer 237 (FIGURES 7 and 8) to position said numeral wheel 230 accurately in every digit-registry position thereof and to restrain it from being moved out of its proper digit-registry position but to permit it to rotate when actuated. The restrainer 237 is rigidly secured to the underside of the top plate 101 at its one end and yieldingly abuts the numeral wheel 230 at its opposite end.

Figure 5:
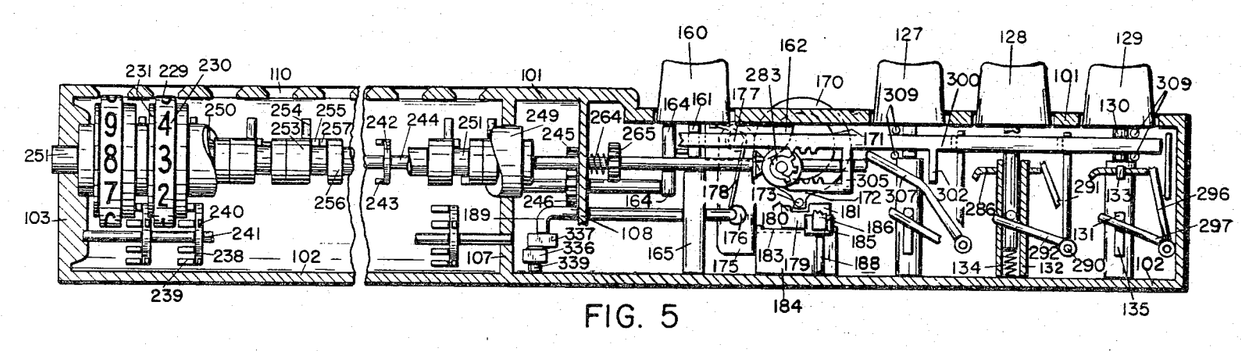
FIGURES 5 to 16, both inclusive, are vertical views partially in section taken substantially along the lines 5—5, 6—6, 7—7, 8—8, 9—9, 10—10, 11—11, 12—12, 13—13, 14—14, 15—15 and 16—16 respectively of FIGURE 4 with certain parts omitted or exploded for sake of clarity.
Figure 7:
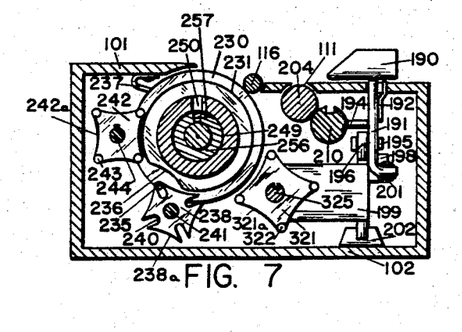
Figure 8:
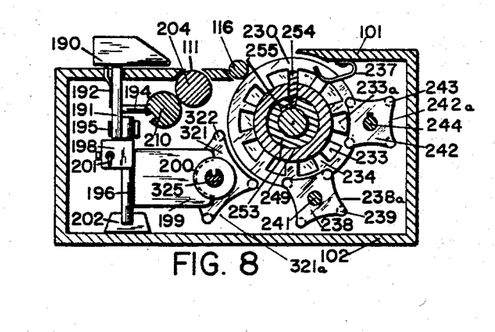

As shown in FIGURES 5, 7, and 8, a plurality of transfer disks 238 are rotatably mounted on a stationary shaft 241, spaced apart one from another. The shaft 241 is rigidly secured at its ends to walls 103 and 107 respectively. Each of the transfer disks 238 is operatively associated with a pair of adjacent numeral wheels 230 and is disposed to carry a digital value of one to a numeral wheel 230 of one order when its adjacent numeral wheel 230 of the next lower order shall have an accumulated digital value exceeding nine, and alternately to borrow a digital value of one from a numeral wheel 230 of one order when its adjacent numeral wheel 230 of the next lower order shall have a residual digital value of less than zero. Each of the transfer disks 238 has, on its leftside face, a plurality of pins 239 adapted for engagement of the ribs 233 of a numeral wheel 230 associated therewith on its left, and, on its rightside face, a plurality of open grooves 240 adapted for ingress and egress thereinto and out of the pin 235 on a numeral wheel 230 associated therewith on its right. When a numeral wheel 230 of one order is being rotated counterclockwise passing its "9"-registry position, or clockwise passing its "0"-registry position, the transfer disk 238 associated therewith is actuated to rotate in the reversed direction thereof upon ingress and egress of the pin 235 on the numeral wheel 230 into and out of one of the grooves 240 in the transfer disk 238, whereby said transfer disk 238 actuates the numeral wheel 230 associated therewith on its left to rotate in the reversed direction thereof from one digit-registry position thereof to a next digit-registry position upon engagement of one of the ribs 233 on the leftside numeral wheel 230 by one of the pins 239 on said transfer disk 238. The peripheral flange 238*a* of each of the transfer disks 238 is so formed as to permit rotation of the pair of associated numeral wheels 230 without actuating said transfer disk 238 to rotate except when the transfer disk 238 is actuated to rotate by the pin 235 on the numeral wheel 230 of the lower order associated therewith.

ZEROIZING

Figure 12:
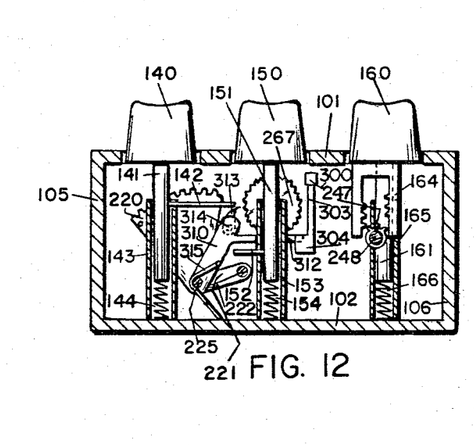
Figure 14:
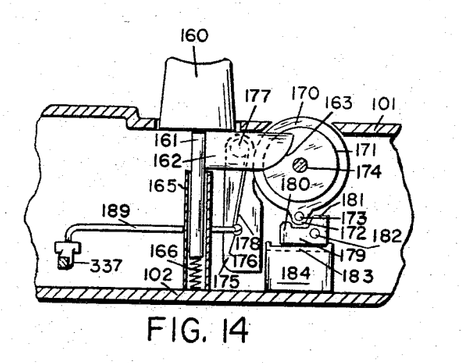

As shown in FIGURES 4, 5 and 8, a plurality of zeroizing disks 242, adapted to zeroize all of the numeral wheels 230 from their random digit-registry positions, are rigidly mounted on a rotary shaft 244, spaced apart one from another. The rotary shaft 244 is journalled at its ends in wall 103 and 107 respectively. Each of the zeroizing disks 242 has on its one side a plurality of pins 243 adapted to engage the ribs 233 on a numeral wheel 230 associated therewith and to rotate the numeral wheel 230. The peripheral flange 242a of each of the zeroizing disks 242 is so formed as to permit rotation of an associated numeral wheel 230 without interference therewith by said zeroizing disk 242 when said zeroizing disk 242 is not rotating. A pinion 245 is rigidly mounted on the rotary shaft 244 at its one end and is in mesh with a driving gear 246 (FIGURE 4). The driving gear 246 is rigidly mounted on a rotary shaft 248 at its one end, and a segmentary pinion 247 is rigidly mounted on the rotary shaft 248 at its other end. The rotary shaft 248 is rotatably journalled at its ends in walls 107 and 108 respectively. The segmentary pinion 247 is adapted for actuation thereof by a fork-shaped rack 164 having a pair of toothed prongs (FIGURE 12). The rack 164 is rigidly secured to the stem 161 of a reset key 160. The reset key 160 (FIGURES 12 and 14) is supported for vertical movement thereof by having its stem 161 extended inwardly into the casing 100 through an aperture in the top plate 101 and slidably inserted into a tubing 165 on the bottom plate 102. The reset key 160 is maintained in and restored to its normally raised position by a spring 166 seated within the tubing 165. Upon depression and subsequent release of the reset key 160, the pair of toothed prongs of the rack 164 successively actuate the segmentary pinion 247 to rotate a complete revolution. The gear 246 rotates with the segmentary pinion 247 and actuates the pinion 245 on the shaft 244 to rotate whereby the zeroizing disks 242 on the shaft 244 rotate therewith. Thereupon, each of the zeroizing disks 242 drives a numeral wheel 230 associated therewith to rotate upon successive engagement of the ribs 233 on its associated numeral wheel 230 by the pins 243 on said zeroizing disk 242. When said numeral 230 has been rotated to its "0"-registry position, the pins 243 on said zeroizing disk 242 will be passing over the partially depressed rib 233a on said numeral wheel 230. Because the depressed rib 233a is not engageable by the pins 243 on said zeroizing disk 242, said numeral wheel 230 ceases to be rotated and remains at its "0"-registry position. On the other side of the stem 161 of the reset key 160, there is an extending arm 162. The upper edge of the arm 162 normally abuts the underside of the top plate 101 thereby limiting the upward movement of the reset key 160. The lower edge of the arm 162 forms a cam surface 163 adapted to engage a pin 173 on the tail 172 of the calculation selector 170 for a purpose to be described hereinafter.

DIGIT INDICATING SYSTEM

Figure 6:
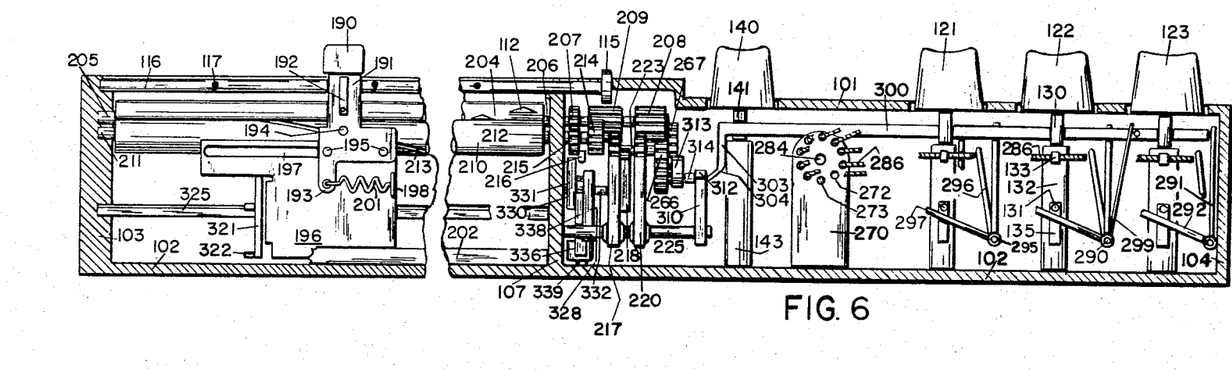

As shown in FIGURES 4 and 6, an indicator axle 204 sion shafts 205 and 206 at its ends respectively and is disposed in front of the train of numeral wheels 230. The indicator axle 204 has, on its periphery, a plurality of indicator marks 112 equally spaced one from another axially as well as radially in such a manner that when the indicator axle 204 is being rotated counterclockwise from one radial position thereof to a succeeding position successively, the indicator marks 112 are moved to their respective positions of display in the indicator slot 111 (FIGURE 1) singly and successively as if the indicator mark 112 is being shifted laterally rightward from one position of display in the indicator slot 111 to a succeeding position of display therein successively. The counterclockwise rotation of the indicator axle 204 is effected by pressing a shift key 140 or any one of the digit keys 121–129. The shift key 140 (FIGURE 12) is supported for vertical movement thereof by having its stem 141 extended into the casing 100 through an aperture in the top plate 101 and slidably inserted into a tubing 143 on the bottom plate 102. The shift key 140 is maintained in and restored to its normally raised position by a spring 144 seated within the tubing 143. On the one side of the stem 141, there is an arm 142 extending outwardly through a slot in the tubing 143 and moving vertically within the limits of the upper and lower edges of the slot thereby limiting the upward and downward movements of the shift key 140. The arm 142 is adapted for engagement of a pin 314 on a spring-loaded crank 310. The crank 310 (FIGURE 12) is pivoted on a stud 225 on the wall 107 and has at its tip an extending arm 312 adapted for engagement thereof by a palm 304 of an arm 303 of an actuating bar 300 (FIGURES 4, 6, and 12). A spring-loaded pawl 313 is pivoted on the pin 314 on the crank 310 and is adapted for engagement of a ratchet wheel 267. The ratchet wheel 267 and an idler gear 266 integral therewith are rotatably mounted on a stud 268 on the wall 107 (FIGURES 4 and 6). The idler gear 266 is in mesh with a gear 265 on the extension shaft 252 of a principal actuating axle 251 when the principal actuating axle 251 is in its normal position, and is also in mesh with a gear 208 on the extension shaft 206 of the indicator axle 204 (FIGURE 6). Upon depression of the shift key 140, the arm 142 on its stem 141 engages the pin 314 on the crank 310 and forces the crank 310 to tilt downward, positioning the pawl 313 thereon for subsequent engagement of the ratchet wheel 267. Upon engagement of the ratchet wheel 267. Upon subsequent release of the shift key 140, the arm 142 on its stem 141 releases its pressure on the pin 314 on the crank 310 thereby permitting the crank 310 to be tilted upward by the spring associated therewith. In the upward tilting of the crank 310, the pawl 313 thereon engages and actuates the ratchet wheel 267 to rotate clockwise one toothspace, whereupon the idler gear 266 integral with the ratchet wheel 267 rotates therewith and drives the gear 265 on the extension shaft 252 of the principal actuating axle 251 and the gear 208 on the extension shaft 206 of the indicator axle 204 each to rotate one tooth-space counterclockwise respectively. The indicator axle 204 rotates with the gear 208 one tooth-space counterclockwise moving one of the indicator marks 112 thereon initially displayed in the indicator slot 111 to a hidden position and a succeeding indicator mark 112 to a position of display in the indicator slot 111. The principal actuating axle 251 rotates with the gear 265 one toothspace counterclockwise positioning an ear 257 of one of a plurality of collars 256 thereon in axial abutment with an ear 255 of one of a plurality of couplers 253 loosely mounted on the principal actuating axle 251, whereby one of the numeral wheels 230 indicated by the succeeding indicator mark 112 displayed in the indicator slot 111 may be coupled with a tubular shaft 249 by the coupler 253 and be actuated to rotate upon a subsequent pressing of any one of the digit keys 121–129 as described hereinafter.

The simultaneous counterclockwise rotation of one tooth-space of the indicator axle 204 and the principal actuating axle 251 is also effected by pressing any one of the digit keys 121–129, as described hereinafter.

When the digit keys 121–129 and the shift key 140 are being selectively pressed in succession, the indicator axle 204, as described hereinbefore, is rotated counterclockwise from its starting position to a succeeding position in succession, whereby the display of indicator mark 112 on the indicator axle 204 in the indicator slot 111 is shifted laterally rightward from its starting position pointed at by the pointer 190 to a succeeding position one after another in succession until it is shifted to its rightmost position of display in the indicator slot 111 whereupon it is automatically shifted back to its starting position of display in the indicator slot 111 pointed at by the pointer 190 upon a subsequent pressing of any one of the digit keys 121–129 or the shift key 140. During the counterclockwise rotation of the indicator axle 204, the gear 208 on its extension shaft 206 drives a spring-loaded sector gear 220

Figure 10:
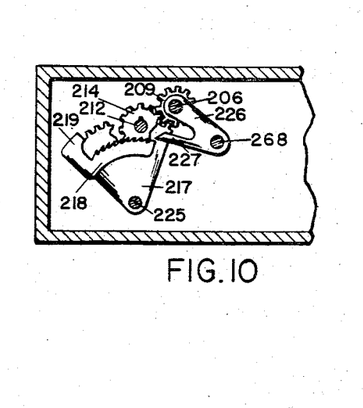
Figure 11:
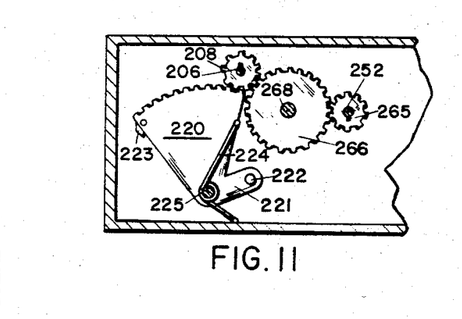

(FIGURE 11) in mesh therewith to rotate clockwise. The sector gear 220 is pivoted on a stud 225 on wall 107 and has a spring-loaded pawl 223 pivoted thereon and normally in engagement with a ratchet rack 218 attached to a sector gear 217 (FIGURE 10). The sector gear 217 is pivotally mounted on the stud 225. When the indicator axle 204 has been rotated counterclockwise to its terminal position whereat the rightmost indicator mark 112 thereon is displayed in the indicator slot 111, the sector gear 220 would have been rotated by the gear 208 on the extension shaft 206 of the indicator axle 204 to a position whereat the pawl 223 on the sector gear 220 abuts the tip of an arm 227 of a disengager 226 (FIGURE 10). The disengager 226 is mounted at one end on the extension shaft 206 of the indicator axle 204 and at its other end on the stud 268. Upon subsequent pressing of any one of the digit keys 121–129 or the shift key 140, the gear 208 on the extension shaft 206 of the indicator axle 204 is actuated, through the intermediation of the crank 310 and the ratchet wheel 267 and its integrated idler gear 266, to rotate counterclockwise one tooth-space as described hereinbefore. The gear 208 thereby actuates the sector gear 220 to rotate one tooth-space clockwise whereby the pawl 223 on the sector gear 220 is disengaged from the ratchet rack 218 on the sector gear 217 by the arm 227 of the disengager 226. The sector gear 220 is then permitted to be rocked by the spring 224 associated therewith to swing counterclockwise until the counterclockwise swinging is arrested by reengagement of the pawl 223 with the ratchet rack 218 through the cooperation of the pawl 223 with a tail or flange 219 of the ratchet rack 218. When the counterclockwise swinging of the sector gear 220 is arrested, the sector gear 220 would have actuated the gear 208 on the extension shaft 206 of the indicator axle 204 to rotate clockwise. The indicator axle 204 rotates with the gear 208 thereon positioning one of the indicator marks 112 thereon to be displayed in the indicator slot 111 and pointed at by the pointer 190 as the starting position of display.

The shifting of the display of the indicator mark 112 on the indicator axle 204 in the indicator slot 111 from any position thereof to its starting position pointed by the pointer 190 is effected by pressing a return key 150. The return key 150 (FIGURE 12) is supported for vertical movement thereof by having its stem 151 extended inwardly into the casing 100 through an aperture in the top plate 101 and slidably inserted into a tubing 153 on the bottom plate 102. The return key 150 is maintained in and restored to its normally raised position by a spring 154 seated within the tubing 153. On the one side of the stem 151, there is an arm 152 extending outwardly through a slot in the tubing 153 and moving vertically within the limits of the upper and lower edges of the slot thereby limiting the upward and downward movements of the return key 150. The arm 152 is adapted to engage a pin 222 on the leg 221 of the spring-loaded sector gear 220 (FIGURE 11) and to tilt the leg 221 downward upon depression of the return key 150. As the leg 221 is being tilted downward, the sector gear 220 swings clockwise until the pawl 223 thereon is disengaged with the ratchet rack 218 on the sector gear 217 by the arm 227 of the disengager 226 as described hereinbefore. When the pawl 223 is thus disengaged with the ratchet rack 218, the sector gear 220 is permitted to be swung counterclockwise by the spring 224 associated therewith until the swinging is arrested, as described hereinbefore, upon subsequent release of the return key 150.

As shown in FIGURE 4 and 6, a selector axle 210 is journalled rotatably in walls 103 and 107 by its extension shafts 211 and 212 at its ends respectively and is disposed parallel to the indicator axle 204. The seelctor axle 210 is adapted to rotate the indicator axle 204 through a train of gearing operatively associated with the extension shafts 206 and 212 of the indicator and selector axles 204 and 210 respectively. This train of gearing comprises a gear 214 rigidly mounted on the extension shaft 212 of the selector axle 210 and in mesh with an idler gear 209 on the extension shaft 206 of the indicator axle 204. The gear 209 is also in mesh with the sector gear 217 (FIGURE 10).

The selector axle 210 is actuated to rotate clockwise or counterclockwise by a pin 194 on the stem 191 of the pointer 190 (FIGURES 6, 7 and 8) travelling in and along a spiral groove 213 in the selector axle 210 upon a lateral movement of the pointer 190 in one direction thereof or in the opposite direction in and along a pointer slot 113 in the top plate 101 (FIGURE 1). The pointer 190 is mounted on a carriage 196 and secured thereto by two pins 195 on its stem 191 extending into and through an elongated slot 197 in the carriage 196 and by a spring 201 anchored to the toe 193 of stem 191 at its one end and to a flap 198 of the carriage196 at its opposite end whereby the pointer 190 is movable with the carriage 196 and also movable thereon. The carriage 196 is mounted for transverse movement thereof on a rail 202 on the bottom plate 102 and is movable with the pointer 190. The pointer 190 is accurately positioned in every position thereof in the pointer slot 113 by seating a resilient flap 192 on its stem 191 in one of a plurality of notches 114 (FIGURE 1) in the pointer slot 113. When the pointer 190 is pointing at the third leftmost register window 110, its carriage 196 would have been moved to its left extremity and cannot be moved further leftward. Notwithstanding the carriage 196 being unmovable further leftward, the pointer 190 is nevertheless movable further leftward to point at the leftmost or the second leftmost register windows 110 because of the spring arrangement associated therewith.

When the pointer 190 is being moved from an initial position pointing at, say, the third leftmost register window 110, to another position pointing at, say, the sixth leftmost register window; the pin 194 on its stem 191 travels in and along the spiral groove 213 in the selector axle 210 in a rightward direction and actuates the selector axle 210 to rotate clockwisely. Through the intermediation of the train of gearing associated with the selector axle 210 and the indicator axle 204, as described hereinbefore, the indicator axle 204 is actuated to rotate counterclockwise, whereupon one of the indicator marks 112 thereon initially displayed in the indicator slot 111 indicating the third leftmost register window 110 is moved to a hidden position and another of the indicator marks 112 thereon is moved to a position of display in the indicator slot 111 to indicate the sixth leftmost register window 110 pointed at by the pointer 190. Conversely, when the pointer 190 is moved from an initial position pointing at, say, the sixth leftmost register window 110, to another position pointing at, say, the third leftmost register window 110, the indicator mark 112 on the indicator axle 204 initially displayed in the indicator slot 111 indicating the sixth leftmost register window 110 is moved to a hidden position and another of the indicator marks 112 thereon is moved to a position of display in the indicator slot 111 to indicate the third leftmost register window 110 pointed at by the pointer 190. When the selector axle 210 is being rotated clockwisely or counterclockwisely, the gear 214 on its extension shaft 212 rotates therewith and actuates the idler gear 209 on the extension shaft 206 of the indicator axle 204 to rotate in the reversed direction thereof. The idler gear 209 in turn actuates the sector gear 217 to rock in the reversed direction thereof whereby the ratchet rack 218 attached to the sector gear 217 forces the sector gear 220 to rock clockwise or permits the sector gear 220 to be rocked counterclockwise by the spring 224 associated therewith to rotate the gear 208 on the extension shaft 206 of the indicator axle 204 in the reversed direction thereof whereby the indicator axle 204 rotates therewith. When the indicator axle 204 is being rotated in the counterclockwise direction, the gear 208 on its extension shaft 206 rotates therewith and actuates the sector gear 220 to pivot clockwisely without actuation of the sector gear 217 to pivot by said sector gear 220 because the pawl 223 on said sector gear 220 will be sliding over the teeth of the ratchet rack 218 on the sector gear 217. Since there is no pivoting of the sector gear 217, there is no actuation thereby of the idler gear 209 on the extension shaft 206 of the indicator axle 204 nor the actuation by the idler gear 209 of the gear 214 on the extension shaft 212 of the selector axle 210, and hence there is no rotation of the selector axle 210. The indicator axle 204 rotates in the clockwise direction only when the pawl 223 on the sector gear 220 is disengaged with the ratchet rack 218 on the sector gear 217 by the disengager 226 as described hereinbefore. When the indicator axle 204 is being rotated clockwisely, the gear 208 on its extension shaft 206 rotates therewith and actuates the sector gear 220 to pivot counterclockwisely without actuating the sector gear 217 to pivot thereby because of the disengagement of the pawl 223 with the ratchet rack 218. As explained hereinbefore, when there is no pivoting of the sector gear 217, there is no rotation of the selector axle 210.

DIGIT ENTRY SYSTEMS

As shown in FIGURES 4 and 5, a principal actuating axle 251 is rotatably journalled in wall 103 by its one end and in wall 108 by its extension shaft 252 at its opposite end, and is disposed coaxially within the bore of the tubular shaft 249, extending axially therethrough beyond the both ends of the tubular shaft 249. The actuating axle 251 is movable axially relative to the tubular shaft 249 and is maintained in and restored to its normal position by a spring 264 surrounding the extension shaft 252 intermediate between the gear 265 thereon and wall 108. On the actuating axle 251, there are slidably mounted a plurality of couplers 253, spaced apart one from another. Each of the couplers 253 has, on its periphery, a finger 254 extending radially outward through the slot 250 in the wall of the tubular shaft 249. The finger 254 is normally positioned at the entrance of one of the grooves 234 in the rightside face of a numeral wheel 230 associated therewith on its left, and is adapted to couple said numeral wheel 230 with the tubular shaft 249 when said finger 254 has been moved into said groove 234 in said numeral wheel 230. Said coupler 253 has, on its one side, an ear 255 adapted for en-engages said ear 255 and moves said coupler 253 axially spaced collars or annular shoulders 256 on the actuating axle 251 in axial abutment therewith. The collars 256 are rigidly mounted on the actuating axle 251 with their respective ears 257 equally arcuately spaced one from another so that at any one radial position of the actuating axle 251 only the ear 255 of one of the couplers 253 axially abut ear 257 of one of the collars 256. When the actuating axle 231 is being moved axially to its left extremity, the ear 257 of one of the collars 256 thereon axially abutting the ear 255 of one of the couplers 253 engages said ear 255 and moves said coupler 253 axially leftward to position its finger 254 within one of the grooves 234 in a numeral wheel 230 operatively associated therewith at its leftside into locking therewith, thereby coupling said numeral wheel 230 with the tubular shaft 249 for rotation therewith. When the actuating axle 251 has been so moved to its left extremity, the ear 257 of a second collar 256 thereon positioned at the leftside of said first coupler 253 radially abuts the ear 255 of a second coupler 253 positioned at the leftside of said second collar 256 and the ear 257 of a third collar 256 positioned at the rightside of said first collar 256 radially abuts the ear 255 of a third coupler 253 positioned at the leftside of said third collar 256. Upon rotation of the actuating axle 251 is a clockwise direction, said second collar 256 drives said second coupler 253 to rotate clockwise. Upon rotation of the actuating axle 251 in a counterclockwise direction, said third collar 256 drives said third coupler 253 to rotate counterclockwise. Should said numeral wheel 230 be the rightmost one of the train of the numeral wheels 230, said third coupler will be the leftmost one and said third collar 256 will be the one at its right. Should said numeral wheel 230 be the leftmost one of the train of the numeral wheels 230, said second coupler 253 will be the rightmost one and said second collar 256 will be the one at its right. The tubular shaft 249 which is coupled with the actuating axle 251 by said second and third couplers 253 and said numeral wheel 230 which is coupled with the tubular shaft 249 by said first coupler 253 rotate with the actuating axle 251 upon rotation thereof. When the actuating axle 251 is being moved axially rightward back to its normal axial position by the spring 264 on its extension shaft 252, said second collar 256 thereon axially abutting the leftside face of said first coupler 253 drives said first coupler 253 to move axially rightward whereby its finger 254 is moved out of the groove 234 in said numeral wheel 230 which is thereby uncoupled with the tubular shaft 249. When the actuating axle 251 has been moved back to its normal axial position, said second and third collars 256 are moved out of radial abutment with said second and third couplers 253 respectively.

A pair of axially-spaced bevel gears 258 and 259 (FIGURE 4) are rigidly mounted on a sleeve 262 which in turn is mounted on and keyed to the extension shaft 252 of the principal actuating axle 251, movable axially thereon and rotatable therewith. Either of the pair of bevel gears 258 and 259 is movable into mesh with a bevel gear 285 on a rotary shaft 284 by a crank 185. The crank 185 (FIGURE 13) is pivoted on a stud 188 on the bottom plate 102 and has one arm 186 extending into a circular groove 261 in the hub 260 of the bevel gear 259 and has another arm 187 extending into an aperture 182 in a moving block 179 (FIGURE 17). The moving block 179 is mounted for transverse movement thereof on a rail 183 on a supporter 184 on the bottom plate 102.

As shown in FIGURES 1 and 4, a calculation selector 170 is pivoted on a stud 174 on wall 106, and has, on the partially recessed portion 171 of its periphery (FIGURES 4 and 13), three calculation signs "+," "—," and "÷," each being visually sighted singly through the calculation window 169. When the calculation selector 170 is in the position of addition indicated by the addition sign "+" displayed in the calculation window 169, the bevel gear 285 is in mesh with the bevel gear 259. Upon turning the calculation selector 170 clockwise from the position of addition to that of subtraction indicated by the subtraction sign "—" displayed in the calculation window 169, the tail 172 of the calculation selector 170 (FIGURE 14) engages a shorter lug or shoulder 180 on the moving block 179 and forces the moving block 179 to move to its left extremity. The crank 185 linked to the moving block 179 is rocked counterclockwise by the moving block 179 thereby moving the bevel gear 259 out of mesh with the bevel gear 285 and the bevel gear 258 into mesh therewith by the action of the arm 186 of the crank 185 which is linked to the hub 260 of the bevel gear 259. When the calculation selector 170 is being turned counterclockwise from the position of subtraction to that of addition, its tail 172 engages a taller lug or shoulder 181 on the moving block 179 and forces the moving block to move to its right extremity whereat the bevel gear 258 is moved out of mesh with the bevel gear 285 and the bevel gear 259 is moved into mesh therewith through the intermediation of the crank 185.

Figure 9:
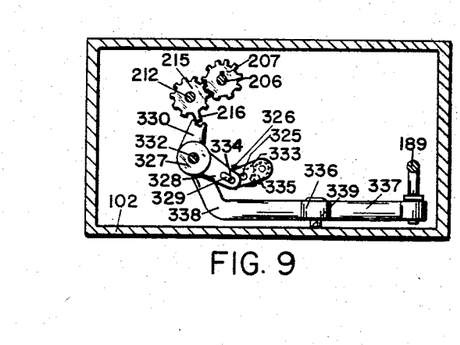

Positioned on the left side of the calculation selector 170 and operatively associated therewith is a spring-loaded wing 175. The wing 175 (FIGURE 14) is pivoted on a stud 177 on wall 106 and linked to a crank 336 by a rod 189 extending into an aperture 176 in the wing 175 at its one end end and into an aperture in an arm 337 of a crank 336 at its opposite end. The crank 336 (FIGURE 9) is pivotally mounted on a stud 339 on the bottom plate 102. When the calculation selector 170 is being turned clockwise from an initial position of addition to that of division, indicated by the division sign "÷" displayed in hte calculation window 169, its tail 172 engages the shorter lug 180 on the moving block 179 and moves the moving block 179 to its left extremity whereby the bevel gear 259 is moved out of mesh with the bevel gear 285 and the bevel gear 258 is moved into mesh therewith, as described hereinbefore in the case of turning the calculation selector 170 from an initial position of addition to that of subtraction. When the moving block 179 has been moved to its left extremity, the shorter lug 180 thereon is no longer engageable by the tail 172 of the calculation selector 170. Upon the calculation selector 170 being turned further in the clockwise direction to the position of division, its tail 172 engages the wing 175 and forces the wing 175 to swing leftward whereby a quotient registering mechanism, as described hereinafter, is rendered operational through the intermediation of the crank 336 linked to the wing 175. When the calculation selector 170 is being turned counterclockwise from the position of division to that of addition, its tail 172 firstly releases its pressure against the wing 175 thereby permitting the wing 175 to be swung back rightward to its normal position by a spring 178 associated therewith, whereby the quotient registering mechanism is rendered inoperational through the intermediation of the crank 336 linked to the wing 175. The tail 172 of the calculation selector 170 thence passes the shorter lug 180 on the moving block 179 without engaging it, engages the taller lug 181 thereon and moves the moving block 179 to its right extremity whereby the bevel gear 258 is moved out of engagement with the bevel gear 285 and the bevel gear 259 is moved into mesh therewith. The calculation selector 170 is restored to the position of addition from an initial position of subtraction or division when the reset key 160 is pressed. Upon pressing the reset key 160, the arm 162 on its stem 161 (FIGURE 14) engages a pin 173 on the tail 172 of the calculator selector 170 and forces the calculator selector 170 to rotate counterclockwise to its position of addition.

DIFFERENTAL ACTUATING MECHANISM

Figure 13:
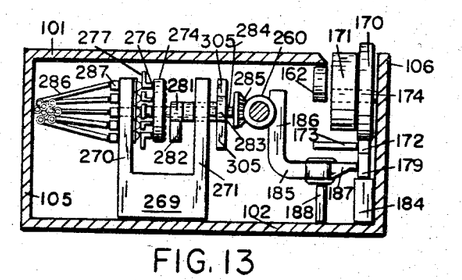

Illustrated in FIGURE 13 is a differential actuating mechanism operable by any one of the digit keys 121–129 to rotate the principal actuating axle 251 one of a plurality of predetermined displacements. This mechanism comprises a disk 274 fixedly mounted on a rotary shaft 284 which is connected at its other end to the bevel gear 285. A rotary tubing 281, having a finger 282 at its one end and a segmentary pinion 283 (FIGURE 5) at its opposite end, is rotatably mounted on the shaft 284 intermediate between the disk 274 and the bevel gear 285. The shaft 284 is rotatably journalled at its ends respectively in walls 270 and 271 of a supporter 269 which is rigidly secured to the bottom plate 102.

Figure 15:
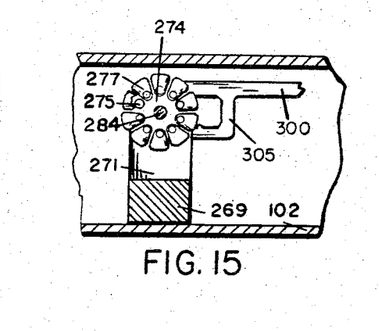

Slidably positioned in ten equally arcuately spaced apertures 275 in the disk 274 (FIGURE 15) are ten pegs 276. Each of the pegs 276 has a tail 277 adapted for engagement thereof by the heel 287 of one of nine flexible shafts 286 operatively associated therewith, and is engageable radially by the finger 282 of the rotary tubing 281 when said peg 278 has been moved outward to a predetermined position by an associated flexible shaft 286. Each of the nine flexible shafts 286 (FIGURE 6) is supported at its one end by having its heel 287 extending into and through one of ten equally arcuately spaced apertures 272 in the wall 270 of the supporter 269, and at its other end by having its head 288 extending into and through an aperture in an ear 133 on a tubing 132 supporting one of the digit keys 121–129 operatively associated therewith. A magnet 273 is rigidly seated in the tenth aperture 272 in the wall 270 and is adapted to retract an outwardly extended peg 276 to its normal position when said peg 276 has been rotated to a position in alignment with the magnet 273.

As shown in FIGURES 4, 5 and 6, an actuating bar 300 is mounted for transverse movement thereof on a plurality of bearing rods 309 journalled in the walls 105 and 106, and is maintained in and restored to its normal position by a spring 299 associated therewith. On the actuating bar 300, there are:

(A) an arm 303 having a palm 304 at its tip slanting downwardly and being adapted for engagement of the extending arm 312 of the spring-loaded crank 310 (FIGURE 12);

(B) an arm 302 adapted for engagement of a spring-loaded crank 307, the crank 307 being pivoted on one of a plurality of rotary shafts 290 and being adapted for engagement of the extension shaft 252 of the principal actuating axle 251;

(C) a fork-shaped rack 305 having a pair of toothed prongs adapted for actuation of the segmentary pinion 283 on the rotary tubing 281 to rotate a complete revolution; and (D) a plurality of lugs 301 adapted for engagement thereof by the arms 291 of the rotary shafts 290.

The rotary shafts 290 are rotatably journalled at their ends in walls 105 and 106 respectively, spaced apart one from another. Each of the shafts 290 has a plurality of vertical arms 291, each arm 291 being adapted for engagement of one of the lugs 301 on the actuating bar 300, and has a plurality of horizontal arms 292, each arm 292 being adapted for engagement thereof by an arm 131 on the stem 130 of one of the digit keys 121–129 associated therewith.

A plurality of spring-loaded bell-cranks 295 are rotatably pivoted respectively on the rotary shafts 290. Each of the bell-cranks 295 has a vertical arm 296 adapted for engagement of the head 288 of one of the flexible shafts 286 associated therewith and a horizontal arm 297 adapted for engagement thereof by the arm 131 on the stem 130 of one of the digit keys 121–129 associated therewith.

DIGIT KEYS

Each of the digit keys 121–129 (FIGURES 5 and 6) has a stem 130 extending inwardly into the casing 100 through an aperture in the top plate 101 and is supported for vertical movement thereof by having the lower end of its stem 130 extending into a tubing 132 on the bottom plate 102, and is maintained in and restored to its normally raised position by a spring 134 seated within the tubing 132. On the one side of the stem 130, there is an arm 131 extending outwardly through a slot 135 in the tubing 132 and moving vertically within the limits of the upper and lower edges of the slot 135 thereby limiting the upward and downward movements of the digit key, one of the digit keys 121–129. The arm 131 is adapted for engagement of the arm 292 of the rotary shaft 290 and the arm 297 of the bell-crank 295 associated therewith respectively.

Upon selective depression of one of the digit keys 121–129, say, digit key 124 having an indicium "4," a chain of actions takes place.

Figure 16:
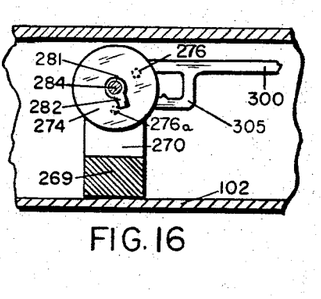

During the downward movement of the digit key 124, the finger 131 on its stem 130 engages the horizontal arm 297 of one of said bell-cranks 295 and actuates said bell-crank 295 to rotate counterclockwise whereby its vertical arm 296 engages the head 288 of one of the flexible shafts 286 associated therewith and forces said flexible shaft 286 to move forward whereupon its heel 287 (FIGURE 13) pushes a peg 276 adjacent thereto outwardly to position said peg 276 to be radially engaged by the finger 282 of the rotary tubing 281, said outwardly extended peg 276 being the fourth peg counting counterclockwise from its terminal position 276a (FIGURE 16).

The actuated flexible shaft 286 is automatically restored to its normal position by the spring associated therewith as soon as the tip of the arm 296 of the bell-crank 295 passes the head 288 of the flexible shaft 286.

Simultaneous with the engagement of the arm 297 of said bell-crank 295, the finger 131 on the stem 130 of the digit key 124 engages the horizontal arm 292 of one of the rotary shafts 290 and actuates said shaft 290 to rotate counterclockwise whereby the vertical arm 291 on said shaft 290 engages one of the lugs 301 on the actuating bar 300 and forces the actuating bar 300 to move leftward. In the leftward movement of the actuating bar 300, the arm 302 on the actuating bar 300 bears and forces the crank 307 to tilt downward whereby the tip of the crank 307 bears against the tip of the extension shaft 252 of the principal actuating axle 251 and forces the principal actuating axle 251 and its extension shaft 252 to move axially to the left extremity of the principal actuating axle 251. In this position, the gear 265 on its extension shaft 252 is moved out of mesh with the idler gear 266, and one of the numeral wheels 230 is coupled with the tubular shaft 249 by one of the couplers 253 on the principal actuating axle 251, as the finger 254 of said coupler 253 has been moved into one of the grooves 234 in said numeral wheel 230 in the leftward movement of said coupler 253. This leftward movement of said coupler 253 is effected by an engagement of its ear 255 by the ear 257 of one of the collars 256 on the principal actuating axle 251 associated therewith on the rightside thereof in the leftward axial movement of the collar 256 with the principal actuating axle 251. At the end of the downward movement of the digit key 124, the actuating bar 300 would have been moved to its left extremity and the fork-shaped rack 305 thereon would have actuated, with its lower toothed prong, the segmentary pinion 283 on the rotary tubing 281 to rotate clockwise half of a revolution.

Upon subsequent release of the digit key 124, it is moved upward to its normally raised position by the spring 134 associated therewith. During the upward movement of the digit key 124, the finger 131 on its stem 130 progressively releases its pressure on the horizontal arm 297 of the bell-crank 295 and the horizontal arm 292 of the rotary shaft 290, thereby permitting said bell-crank 295 and said rotary shaft 290 to be rotated clockwise back to their respective normal positions by the springs associated therewith respectively. When said rotary shaft 290 is rotating clockwise, its vertical arm 291 progressively releases its pressure against the lug 301 on the actuating bar 300, thereby permitting the actuating bar 300 to be moved rightward by the spring 299 associated therewith, whereby the upper toothed prong of the fork-shaped rack 305 on the actuating bar 300 actuates the segmentary pinion 283 to continue its clockwise rotation of another half of a revolution. Immediately after completion of actuation of the segmentary pinion 283 by the fork-shaped rack 305, the arm 302 on the actuating bar 300 completely relieves its bearing on the crank 307, thereby permitting the crank 307 to be tilted upward to its normal position by the spring associated therewith. When the crank 307 has been restored to its normal position, it completely relieves its bearing against the extension shaft 252 of the principal actuating axle 251, thereby permitting the principal actuating axle 251 and its extension shaft 252 to be moved rightward back to their respective normal positions by the spring 264 on the extension shaft 252. When the principal actuating axle 251 and its extension shaft 252 have been moved back to their respective normal positions, the gear 265 on the extension shaft 252 is moved into mesh with the idler gear 266 and said coupler 253 is moved out of engagement with said numeral wheel 230 by a collar 256 on its left thereby uncoupling said numeral wheel 230 with the tubular shaft 249.

When the segmentary pinion 283 has completed its clockwise rotation, the finger 282 on the rotary tubing 281 would have rotated clockwise one complete revolution with the segmentary pinion 283. During this clockwise rotation of the finger 282, it engages the outwardly extended peg 276 in the disk 274 after having rotated six tenths of a revolution and actuates the disk 274 to rotate four tenths of a revolution at the completion of the rotation of the finger 282. The bevel gear 285 rotates with the disk 274 four tenths of a revolution and actuates one of the pair of the bevel gears 258 and 259 then in mesh therewith to rotate four tenths of a revolution clockwise or counterclockwise as the case may be. The principal actuating axle 251 rotates in the same rotary direction with either of the pair of the bevel gears 258 and 259 four tenths of a revolution. When the principal actuating axle 251 is being thus rotated four tenths of a revolution, said numeral wheel 230 which is coupled with the tubular shaft 249 which is in turn coupled with the actuating axle 251, as explained hereinbefore, rotates therewith four tenths of a revolution, whereby a new digital indicium 229 on the periphery of the actuated numeral wheel 230 is displayed in the register window 110. The new digital indicium 229 has a digital value which is four more or less than that of the indicium thereon initially displayed in the register window 110 depending on whether the calculation selector 170 is in the position of addition or that of subtraction.

At the completion of rotation of the disk 274, the outwardly extended peg 276 would have been rotated to a position in alignment with the magnet 273 in the wall 270 of the supporter 269 and is retracted to its normally non-engageable position by the magnet 273.

When the actuating bar 300 has been moved to its left extremity at the end of the downward movement of the digit key 124, the arm 303 of the actuating bar 300 would have been moved to a position whereat the extending arm 312 of the crank 310 is beneath the slanting palm 304 of the arm 303 of the actuating bar 300. When the actuating bar 300 is being moved rightward in the upward movement of the digit key 124, the extending arm 312 of the crank 310 is being tilted downward by the underside of the slanting palm 304 until the palm 304 passes the extending arm 312 of the crank 310, whereupon the crank 310 is tilted upward to its normal position by the spring associated therewith. In the upward tilting of the extending arm 312 of the crank 310, the pawl 313 thereon actuates the ratchet wheel 267 to rotate clockwise one tooth-space, whereby its integral idler gear 266 rotates therewith clockwise one tooth-space. The idler gear 266 thereby actuates the gear 208 on the extension shaft 206 of the indicator axle 204 and the gear 265 on the extension shaft 252 of the principal actuating axle 251 each to rotate one tooth-space counterclockwise, whereby the indicator mark 112 on the indicator axle 204 initially displayed in the indicator slot 111 is moved to a hidden position and a succeeding indicator mark 112 is moved to a position of display in the indicator slot 111, and the ear 257 of a succeeding collar 256 on the principal actuating axle 251 is positioned axially abutting the ear 255 of a coupler 253 which is to couple a succeeding numeral wheel 230 indicated by the succeeding indicator mark 112 displayed in the indicator slot 111 with the tubular shaft 249 upon a subsequent pressing of any one of the digit keys 121-129.

DIVISION PROCESSING SYSTEM

A division disk 321 (FIGURE 4), adapted for actuation of a numeral wheel 230 in operative association therewith on which quotient of division is to be registered and accumulated, is mounted on and keyed to a shaft 325, movable axially thereon and rotatable therewith. The shaft 325 is journalled at its both ends in walls 103 and 107 respectively, parallel to and in front of the train of numeral wheels 230. The numeral wheel 230 operatively associated with the division disk 321 is the second numeral wheel 230 to the left of the numeral wheel 230 pointed at by the pointer 190. The division disk 231 (FIG- URE 8) has, on its one side a plurality of pins 322 adapted for engagement of the ribs 233 of a numeral wheel 230 associated therewith and to rotate said numeral wheel 230 counterclockwisely from one digit-registry position thereof to a next digit-registry position upon rotation of the division disk 321 of a predetermined increment. The division disk 321 is linked to the carriage 196 of the pointer 190 by a flap 199 on the carriage 196. The flap 199 has a notch 200 in its tip extending into a circular groove 324 (FIGURE 4) in the hub 323 of the division disk 321 to be embraced thereby, so that the division disk 321 is movable laterally with the pointer 190. The peripheral flange 321a of the division disk 321 is so formed as to permit lateral movement of the division disk 321 without interference with the numeral wheels 230.

A ratchet pinion 326 (FIGURES 4 and 9) is rigidly mounted on the shaft 325 at its right end and is adapted for actuation thereof by a spring-loaded pawl 335 pivoted on the one end of a crank 333; the crank 333 is pivoted on the shaft 325 and linked to a bell crank 327 by a pin 334 on its opposite end. The pin 334 extends into and through a slot 329 in an arm 328 of the bell crank 327. The bell crank 327 is mounted on a stud 332 on wall 107 and is movable thereon axially as well as radially. The bell crank 327 has a fork-tipped arm 330 adapted for actuation thereof by a protruding tooth 216 on the one side of an idler gear 215. The idler gear 215 is loosely mounted on the extension shaft 212 of the selector axle 210. The fork tip of the arm 330 of the bell crank 327 is normally nonengageable by the tooth 216 on the idler gear 215 and is only engageable thereby when the bell crank 327 has been moved axially to a predetermined position. The moving of the bell crank 327 from nonengageable to engageable position or vice versa is controlled by the calculation selector 170 through the intermediation of the crank 336, as described hereinbefore.

Division is primarily a process of repeated cycles of subtraction of a divisor from a dividend to obtain a quotient which is the maximum number of cycles of said subtraction. It is on the basis of this principle that division is operated and performed in this machine.

The dividend is firstly entered into the register by pressing successively the digit keys 121–129 and the shift key 140 corresponding to the dividend and then, when necessary, pressing the return key 150 to return the display of the indicator mark 112 in the indicator slot 111 to its starting position of display in the indicator slot 111 pointed at by the pointer 190. The entry of dividends into the register should always start at the third leftmost register window 110 by setting the pointer 190 to point at that register window 110 so that the division disk 321 is moved into operative association with the leftmost numeral wheel 230 whereby the first digit of the quotient of the division will be registered on the leftmost numeral wheel 230 and displayed in the leftmost register window 110.

After entry of the dividend into the register, the calculation selector 170 is turned to the position of division indicated by the division sign "÷" displayed in the calculation window 169. In so doing, as described hereinbefore, the bevel gear 253 is moved into mesh with the bevel gear 285 whereby all entries of digital value into the register by pressing the digit keys 121–129 will be negative or subtractive. Furthermore, the bell crank 327 is moved, through the intermediation of the crank 336, into the predetermined position whereat the fork tip of its arm 330 is engageable by the protruding tooth 216 on the idler gear 215, thereby rendering the quotient registering mechanism operational.

Dividing of the divisor into the dividend is then operated by pressing the digit keys 121–129 and the shift key 140 corresponding to the divisor and, when necessary, the return key 150 successively and repeatedly until the dividend or the partial dividend which is being divided by the divisor is reduced to an amount less than the divisor. At the completion of each dividing, a digital value of one representing the quotient of the dividing is registered and accumulated on the numeral wheel 230 operatively associated with the division disk 321. When the return key 150 is pressed at the end of each dividing, it initiates a chain of actions of the gearing associated with the return key 150 and the indicator axle 204, as described hereinbefore, whereby the indicator axle 204 is actuated to rotate firstly counterclockwise to its terminal position and thence clockwise to its starting position. During the reciprocal rotation of the indicator axle 204, the gear 207 on its extension shaft 206 drives the idler gear 215 to rotate whereby the protruding tooth 216 on the idler gear 215 engages the fork tip of the arm 330 of the bell crank 323 and actuates the bell crank 328 to rock reciprocally. The bell crank 328 thereby actuates the crank 333 to rock reciprocally, whereby the ratchet pinion 326 on the shaft 325 is actuated by the pawl 335 on the crank 333 to rotate clockwise one predetermined increment whereupon the shaft 325 and the division disk 321 thereon rotate with the ratchet pinion 326 in the same clockwise direction. The division disk 321 thereby actuates the numeral wheel 230 operatively associated therewith to rotate counterclockwise from a digit-registry position thereof to a next-digit registry position.

On this machine, all of the four processes of arithmetic: addition, subtraction, multiplication, and division, can be operated and performed with their respective results: sum of addition, remainder of subtraction, product of multiplication, and quotient of division, visually displayed in the register windows 110.

At the start of an operation of any one of the four processes of arithmetic, the numerals displayed in the register windows 110 are to be completely zeroized and the calculation selector 170 is to be in the position of addition indicated by the addition sign "+" displayed in the calculation window 169, by pressing the reset key 160. An appropriate set of punctuation marks 117 is displayed to punctuate the numerals to be displayed in the register windows 110 by selective turning of the punctuation-mark selector 115.

In performing an addition, for example:

$$987.65 + 123.45$$

the operations are as follows:

Step 1: Set pointer 190 to point at the fifth rightmost register window 110 corresponding to the first digit of the first factor "987.65."

Step 2: Enter the first factor "987.65" by pressing in succession the digit keys 129, 128, 127, 126, and 125 having thereon digital indicia corresponding to the first factor, whereupon there are displayed in the register windows 110 the numerals "9, 8, 7, 6, 5."

Step 3: Enter the second factor "123.45" by pressing in succession the digit keys 121, 122, 123, 124, and 125 having thereon digital indicia corresponding to the second factor, whereupon the numerals initially displayed in the register windows 110 are changed into numerals "1, 1, 1, 1, 1, 0" which are punctuated into "1,111.10," the sum of the addition.

In performing a subtraction, for example:

$$987.65 - 123.45$$

the operation are as follows:

Steps 1 and 2: Identical to steps 1 and 2 of addition described hereinbefore.

Step 3: Turn calculation selector 170 to the position of subtraction indicated by the subtraction sign "−" displayed in the calculation window 169.

Step 4: Enter the second factor "123.45" in the same manner as step 3 of addition described hereinbefore, whereupon there are displayed in the register windows 110 numerals "8, 6, 4, 2, 0" which are punctuated into "864.20," the remainder of the subtraction.

In performing a multiplication, for example:

$$123.45 \times 67$$

the operations are as follows:

Step 1: Set pointer 190 to point at the fifth rightmost register window 110 corresponding to the first digit of the multiplicand "123.45."

Step 2: Multiply the multiplicand "123.45" by the unit-digit "7" of the multiplier "67" by pressing the digit keys 121, 122, 123, 124, and 125 having thereon digital indicia correspoding tot he multiplicand successively and repeatedly seven times, whereupon there are displayed in the register windows 110 numerals "8, 6, 4, 1, 5."

Step 3: Move pointer 190 one position to the left.

Step 4: Multiply the multiplicand "123.45" by the tens-digit "6" of the multiplier "67" by pressing the digit keys 121, 122, 123, 124, and 125 and the return key 150 successively and repeatedly six times, whereupon the numerals initially displayed in the register windows 110 are changed into numerals "8, 2, 7, 1, 1, 5" which are punctuated into "8,271.15," the product of the multiplication.

In performing a division, for example:

$$9876 \div 234$$

the operations are as follows:

Step 1: Set pointer 190 to point at the third leftmost register window 110.

Step 2: Turn punctuation-mark selector 115 until no punctuation mark is visually displayed.

Step 3: Enter the dividend "9876" by pressing in succession the digit keys 129, 128, 127, and 126 having thereon digital indicia corresponding to the dividend "9876," and the return key 150, whereupon there are displayed in the register windows 110 numerals "9, 8, 7, 6."

Step 4: Set decimal pointer 119 at the rightside of the unit-digit "6" of the dividend "9876" and set decimal pointer 118 four places to the left of the decimal pointer 119; the decimal pointer 119 designating the decimal point of the dividend "9876" and the decimal pointer 118 designating the decimal point of the quotient to be obtained (the decimal point of the quotient should always be placed at the left of the decimal point of the dividend one place more than the number of integers of the divisor, decimals of the divisor being ignored for this purpose).

Step 5: Turn the calculation selector 170 to the position of division indicated the division sign "÷" displayed in the calculation window 169.

Step 6: Divide the divisor "234" into the partial dividend "987" by pressing the digit keys 122, 123, and 124 having thereon digital indicia corresponding to the divisor "234," and the return key 150 successively and repeatedly until the partial dividend "987" has been reduced to an amount less than the divisor "234."

Step 7: Move pointer 190 one position to the right.

Step 8: Resume dividing in the same manner as step 6 above.

Finally, there are displayed in the register windows 110 numerals "4, 2, 0, 0, 4, 8" with the decimal pointers 118 and 119 positioned at the rightside of the second numeral "2" and the sixth numeral "8" respectively, and the pointer 190 pointing at the fourth numeral "0." The first and second numerals "4, 2" displayed in the register windows 110 at the left of the pointer 190 are the digits of the quotient and the fifth and sixth numerals "4, 8" displayed in the register windows 110 at the right of the pointer 190 are the digits of the undivided residual dividend, presenting distinctively and accurately a quotient of "42" and an undivided residual dividend of "48."

What is claimed is:

1. A calculating machine comprising in combination: a register having a plurality of ordinally arranged numeral wheels mounted on a rotatably-mounted hollow shaft, each of said wheels having a peripheral flange with a plurality of indicia of a sequence of digits including zero inscribed thereon; a plurality of couplers mounted on a rotatably-mounted and axially-movable actuating axle and being operatively connected to said shaft, each of said couplers being selectively movable into engagement with one of said wheels operatively associated therewith, said axle being disposed within said hollow shaft coaxially therewith and having a plurality of spaced-apart shoulders formed thereon for selectively engaging and moving one of said couplers into engagement with its associated said wheel thereby coupling said wheel with said shaft for rotation therewith upon an axial movement of said axle to a predetermined position; and at said predetermined position of said axle, another of its said shoulders being moved into driving engagement with a second one of said couplers to rotate said shaft upon rotation of said axle; said coupler in engagement with its associated said wheel being moved out of engagement therewith by one of said shoulders axially abutting said coupler engaged with its associated said wheel on the opposite side from said shoulder initially engaging said coupler upon subsequent returning of said axle to its normal position thereby uncoupling said wheel with said shaft; means for returning and axle to its normal position; a set of slidably-mounted reciprocally movable and selectively-operable keys, each of said keys having means to restore itself to its normal position and having thereon an indicium of one of a sequence of digits and being adapted to operate means for moving said axle axially to said predetermined position, means for rotating said axle one of a plurality of predetermined differing displacements corresponding to the digital indicium on an operated said key, and means for rotating said axle in a predetermined direction a predetermined increment to position itself for a subsequent actuation of the other of said couplers to couple a succeeding said wheel with said shaft.

2. The calculating machine of claim 1 having, in combination, means for visually punctuating the digital indicia of said numeral wheels by one of a plurality of differing sets of punctuation marks; said means comprising: a rotatably-mounted axle having a plurality of differing sets of punctuation marks inscribed on its periphery; and a manipulator operatively connected to said axle and operable to rotate said axle to a selected position where one of said sets of differing punctuation marks may visually punctuate the digital indicia of said numeral wheels.

3. The calculating machine of claim 2 having, in combination, resilient means engaging said numeral wheel for restraining rotation of said numeral wheels except those of said wheels which are to rotate.

4. The calculating machine of claim 2 in which each of said numeral wheels has a plurality of arcuately spaced ribs formed on its side facing its adjacent wheel of the next lower order and a projection formed on its opposite side; each of said couplers has a member extending outwardly through a slot in said shaft for connecting said coupler with said shaft and for selectively engaging one of said wheels operatively associated therewith, and a projection extending sidewise from its one side; each of said shoulders on said actuating axle has a projection extending sidewise from its one side facing said projection on its adjacent said coupler, said shoulder projections being so arcuately spaced one from the other that only the projection on one of said shoulders axially abuts the projection on one of said couplers in any one radial position of said axle and that the projection on another of said shoulders is simultaneously positioned arcuately adjacent the projection on another of said couplers in driving relationship when said axle has been moved to said predetermined position.

5. The calculating machine of claim 4 having, in combination, carrying and borrowing means; said means comprising: a plurality of rotatably-mounted disks, each of said disks being operatively associated with a pair of adjacent said wheels and having a plurality of arcuately spaced open grooves formed in its one side and a plurality of arcuately spaced projections formed on its opposite side extending sidewise, whereby upon rotation of its associated said wheel of the lower order in the one direction thereof passing its highest digit-registry position and in the reversed direction passing its zero-registry position, said disk is actuated to rotate an increment in the reversed direction thereof by ingress and subsequent egress of the projection on said wheel of the lower order into and out of one of said grooves in said disk whereby one of the projections on said disk engages one of the ribs on its associated wheel of the higher order and actuates said wheel of the higher order to rotate from one digit-registry position thereof to a succeeding digit-registry position.

6. The calculating machine of claim 5 having, in combination, means for zeroizing those of said numeral wheels that are not in zero-registry position; said means comprising: one of said ribs on each of said numeral wheels being depressed in a radial direction, said depressed rib having a predetermined arcuate relationship to the zero indicium on said wheel; a plurality of zeroizing disks fixedly mounted on a rotatably-mounted shaft, each of said disks having a plurality of arcuately spaced projections formed on its one side facing said ribs on its associated said wheel, said projections being positioned to engage all of said ribs on said wheel operatively associated therewith, except said depressed rib, to rotate said associated wheel ultimately to its zero-registry position upon rotation of said disk; and means for rotating said shaft and all of said disks fixedly mounted thereon.

7. The calculating machine of claim 6 having, in combination, means for rotating said actuating axle a plurality of predetermined differing displacements; said means comprising: a slidably-mounted actuating rod movable laterally in one direction thereof to a predetermined position upon selective depression of one of said keys and movable in the opposite direction to its normal position by a means associated therewith upon subsequent release of said depressed key; a toothed-rack fixedly attached to said rod and positioned to drive a pinion to rotate in a predetermined direction one complete revolution upon a reciprocal movement of said rod; a hollow cylindrical member having a radially extending projection at its one end and having said pinion fixedly mounted thereon, said cylindrical member being rotatably mounted on a rotatably-mounted stub shaft, said stub shaft having a disk fixedly mounted thereon at its one end and being operatively connected to said actuating axle; a plurality of slidable pegs seated respectively in a plurality of arcuately spaced apertures in said disk and being movable outwardly to a predetermined position to be drivingly engaged by said projection on said cylindrical member; a plurality of slidably-mounted and spring-loaded flexible shafts, each of said shafts being operatively associated with one of said keys at its one end and with one of said pegs at its opposite end, whereby upon selective depression of one of said keys, one of said flexible shafts associated therewith is actuated to move forward and drives one of said pegs associated therewith at its opposite end to move outwardly to a predetermined position to be engaged and driven by said projection on said cylindrical member to rotate with said disk one of a plurality of differing displacements corresponding to the digital indicium on one of said keys which is being operated; and means for automatically moving said outwardly extended peg back to its normally nonengageable position after completion of said rotation of said disk.

8. The calculating machine of claim 7 in which said means for moving said outwardly extended peg back to its normally nonengageable position comprises a magnetic element fixedly seated in one of said apertures in said disk positioned to attract said outwardly extended peg back to its normally nonengageable position after completion of said rotation of said disk.

9. The calculating machine of claim 7 having, in combination, a plurality of rotatably-mounted shafts, each of said shafts having a primary extending arm positioned to engage one of a plurality of projections on said actuating rod and having a plurlity of secondary extending arms, each of which is positioned for engagement thereof by a projection on the stem of one of said keys operatively associated therewith; and a plurality of bell-crank levers rotatably pivoted on said shafts, each of said levers having a first extending arm positioned to engage one end of one of said flexible shafts operatively associated therewith and having a second extending arm positioned for engagement thereof by said projection on the stem of one of said keys associated therewith; whereby upon selective depression of one of said keys, the projection on the stem of said key engages the secondary arm of one of said shafts operatively associated therewith and actuates said shaft to rotate in the one direction thereof whereby the primary arm of said associated shaft engages one of the projections on said actuating rod and actuates said actuating rod to move laterally in the one direction thereof to a predetermined position; said projection on the stem of said key simultaneously engages the second extending arm of one of said bell-crank levers operatively associated therewith and actuates said lever to pivot in the one direction thereof whereby the first extending arm of said lever engages the one end of one of said flexible shafts operatively associated therewith and actuates said flexible shaft to move forward whereby the opposite end of said flexible shaft engages and moves its associated said peg outwardly to its said predetermined position to be engaged by said projection on said cylindrical member; said flexible shaft being automatically retracted to its normal position by its associated spring after said peg having been so moved outwardly.

10. The calculating machine of claim 8 having, in combination, means for moving said actuating axle axially to said predetermined position; said means comprising a pivotedly-mounted crank lever positioned to engage one end of said actuating axle and to move said actuating axle axially to said predetermined position upon actuation of said crank by an arm of said actuating rod in a forward lateral movement thereof.

11. The calculating machine of claim 9 having, in combination, means for selecting and directing rotation of said actuating axle in either direction thereof; said means comprising; a sleeve having a pair of spaced-apart bevelled gears mounted on said actuating axle for axial movement thereon and for rotation therewith; means for moving said sleeve axially to either of two selected axial positions; a third bevelled gear fixedly mounted on said stub shaft at its one end and positioned to drive one of said pair of bevelled gears and to rotate said actuating axle in one of the rotary directions thereof depending upon which one of said pair of bevelled gears being engaged by said third bevelled gear.

12. The calculating machine of claim 11 having, in combination, means for indicating which one of said numeral wheels is to be actuated; said means comprising: a rotatably-mounted indicator axle having a plurality of indicator marks inscribed on its periphery, each of said marks being individually and selectively visually sighted for indicating one of said numeral wheels to be actuated, said indicator axle being operatively connected to said actuating axle when said actuating axle is in its normal position, whereby upon rotation of either of said axles when said actuating axle is in its normal position, the other of said axles rotates synchronizingly to position one of said indicator marks on said indicator axle to indicate one of said numeral wheels to be actuated.

13. The calculating machine of claim 12 in which said indicator axle is operatively connected to said actuating axle, when said actuating axle is in its normal position, by a rotatably-mounted idler gear engaging a gear fixedly mounted on said actuating axle and a second gear fixedly mounted on said indicator axle respectively.

14. The calculating machine of claim 13 having, in combination, means for presetting a pointer to indicate a selected said numeral wheel where every entry of a number is to begin; said means comprising: a rotatably-mounted selector axle having a spiral groove formed in its periphery, a slidably-mounted pointer for pointing at said selected wheel, said pointer having a projection positioned in said groove for rotating said selector axle upon a lateral movement of said pointer in either direction thereof, said selector axle being operatively connected with said indicator axle for rotation therewith but not for rotation thereby, whereby upon rotation of said selector axle, said indicator axle rotates therewith to position one of said indicator marks to be visually sighted coincident with said numeral wheel pointed at by said pointer.

15. The calculating machine of claim 14 in which a third gear is fixedly mounted on said selector axle and drivingly engages a rotatably-mounted second idler gear, said second idler gear drivingly engaging a pivotally-mounted first toothed member; a ratchet rack attached to said first toothed member; a pivotally-mounted and spring-biased second toothed member; a pawl pivoted on said second toothed member and being normally in engagement with said ratchet rack, said second toothed member drivingly engaging a fourth gear fixedly mounted on said indicator axle, whereby rotation of said selector axle actuates said indicator axle to rotate but rotation of said indicator axle does not actuate said selector axle to rotate.

16. The calculating machine of claim 15 having, in combination, means for automatically returning said indicator mark to its starting position selected and preset by said pointer from a position indicating the numeral wheel of the lowest order of said register; said means comprising: a disengaging element positioned to engage said pawl on said second toothed member for disengagement of said pawl from said ratchet rack after said second toothed member having been rotated to its disengaging position upon rotation of said indicator axle passing its visual indication of said numeral wheel of the lowest order by one of its said indicator marks; whereby said second toothed member when so disengaged, is returned to its starting position by its associated spring; and a flange on said ratchet rack positioned to abut said pawl on said second toothed member to rengage said second toothed member with said ratchet rack.

17. The calculating machine of claim 16 having, in combination, means for partially rotating said indicator axle to successively indicate which of said numeral wheels to be actuated after each operation of a selected said key; said means comprising: a pivotally-mounted and spring-biased crank lever having a pawl pivoted thereon, said pawl being positioned to engage and drive a ratchet wheel integral with said first idler gear to rotate a predetermined increment in a predetermined direction upon a reciprocal rocking of said crank lever, said lever having an extending arm positioned for engagement thereof by a palm of a second extending arm of said actuating rod, whereby upon a reciprocal movement of said actuating rod, said crank lever is actuated by said actuating rod to rock reciprocally, said reciprocal movement of said actuating rod being actuated by one of said keys upon selective operation thereof.

18. The calculating machine of claim 17 having, in combination, a shift key operable to drive said crank lever to rock reciprocally whereby said pawl thereon engages and drives said ratchet wheel to rotate with its integrated idler gear a predetermined increment in said predetermined direction thereby moving said visible indicator to a succeeding position.

19. The calculating machine of claim 16 having, in combination, means for automatic registration of quotient of a division; said means comprising: a division disk mounted on a rotatably-mounted division shaft for axial movement thereon and for rotation therewith, said disk having a plurality of arcuately spaced projections formed on its one side, each of said projections being positioned to engage one of the ribs on one of said numeral wheels operatively associated therewith and to drive said associated wheel to rotate from one digit-registry position thereof to a succeeding digit-registry position upon rotation of said disk in a predetermined direction a predetermined increment; said disk being operatively connected to and movable laterally with said pointer; said division shaft being operatively associated with said indicator axle and being rotated in said predetermined direction said predetermined increment by said indicator axle upon a reciprocal movement of said indicator axle from any position thereof firstly to its terminal position and thence to its starting position initially set by said pointer.

20. The calculating machine of claim 19 in which a ratchet element is fixedly mounted on said division shaft at its one end, a lever rotatably mounted on said one end of said division shaft, said lever having a pawl pivoted thereon at its one end and having a projection formed at its opposite end, said projection extending into a slot in a first extending arm of a pivotally-mounted and axially-movable bell-crank lever, said pawl being positioned to drive said ratchet element to rotate with said division shaft and said disk thereon in said predetermined direction said predetermined increment upon a reciprocal rocking of said lever, said bell-crank lever having a second extending arm; a rotatably-mounted third idler gear drivingly engaged by a fourth gear fixedly mounted on said indicator axle and having a protruding tooth formed on its one side, said protruding tooth being positioned to engage said second arm of said bell-crank lever when said bell-crank lever has been moved to a predetermined position, whereby upon a reciprocal rotation of said indicator axle, said fourth gear and said protruding tooth rotate therewith and rock said bell-crank lever reciprocally, said reciprocal rocking of said bell-crank lever imparting a reciprocal rocking motion to said lever for rotating said division shaft said predetermined increment.

21. The calculating machine of claim 20 having, in combination, means for selecting and presetting its mechanism for operation of one of the three calculations: addition including multiplication, subtraction, and division; said means comprising: a slidably-mounted element having a shorter shoulder at its one end and a taller shoulder at its opposite end, said element being operatively connected to said sleeve for moving said sleeve to either of its axial positions for engagement of one of said pair of bevelled gears with said third bevelled gear; a pivotally-mounted disk having spaced-apart signs of "+," "—," and "÷" inscribed on its peripheral flange for selective visual sighting, the peripheral flange of said disk having a protruding portion positioned to engage either of said shoulders of said element to move said element in either lateral direction thereof upon rotation of said disk in either rotary direction thereof; a pivotally-mounted and spring-biased wing biasly engaging the peripheral flange of said disk, said wing being operatively connected to said bell-crank lever for moving said lever from its normal position to its said predetermined position for operation of registration of quotient of a division, whereby upon rotation of said disk to its position of division, said wing is pivoted by said protruding portion of the peripheral flange of said disk to move said bell-crank lever to its operating position for registration of quotient of division.

22. A calculating machine comprising, in combination: a register having a plurality of ordinally arranged numeral wheels mounted on a rotatably-mounted shaft, each of said wheels being positioned for selective coupling thereof with said shaft for rotation therewith; a set of slidably-mounted reciprocally-movable and selectively-operable keys, each of said keys having means to restore itself to its normal position after operation thereof and having thereon an indicium of one of a sequence of digits and being adapted to operate means for coupling a selected said wheel with said shaft, means for rotating said shaft one of a plurality of predetermined differing displacements corresponding to the digital indicium on said operated key, means for uncoupling said selected wheel with said shaft after its said rotation, and means for arranging another of said wheels including a wheel of a higher order for coupling thereof with said shaft after uncoupling of said selected wheel with said shaft by a subsequent operation of one of said keys.

References Cited by the Examiner

UNITED STATES PATENTS

| | | | |
|---|---|---|---|
| 810,090 | 1/1906 | Sharp | 235—63 |
| 3,100,602 | 8/1963 | Shu K. Lear Voo | 235—82 |

RICHARD B. WILKINSON, *Primary Examiner.*

LEO SMILOW, *Examiner.*

T. J. ANDERSON, S. A. WAL, *Assistant Examiners.*